United States Patent [19]

Lockwood

[11] Patent Number: 4,743,974
[45] Date of Patent: May 10, 1988

[54] DUAL SCANNING ARRAY RASTER INPUT SCANNER

[75] Inventor: Dan F. Lockwood, Ontario, N.Y.

[73] Assignee: Xerox Corporation, Stamford, Conn.

[21] Appl. No.: 943,280

[22] Filed: Dec. 18, 1986

[51] Int. Cl.$^4$ ............................................. H04N 1/04
[52] U.S. Cl. .................................. 358/285; 358/293; 358/296; 355/23
[58] Field of Search ............... 358/285, 293, 288, 294, 358/296; 355/23, 25

[56] References Cited

U.S. PATENT DOCUMENTS

| | | | |
|---|---|---|---|
| 4,261,661 | 4/1981 | Thiers | 355/24 |
| 4,429,333 | 1/1984 | Davis et al. | 358/293 |
| 4,475,128 | 10/1984 | Koumura | 358/296 |
| 4,536,077 | 8/1985 | Stoffel | 355/8 |
| 4,562,485 | 12/1985 | Maeshima | 358/280 |
| 4,563,706 | 1/1986 | Nagashima | 358/280 |
| 4,571,636 | 2/1986 | Itoh | 358/285 |

OTHER PUBLICATIONS

Xerox Disclosure Journal; "Automatic Duplex Document Electronic Scanning"; R. E. Smith; vol. 8; No. 3; May/Jun. 1983; p. 263.

Primary Examiner—Tommy P. Chin
Attorney, Agent, or Firm—Mark Costello

[57] ABSTRACT

A dual mode raster input scanner to scan either or both sides of a moving document advancing along a paper path through a scanning station in a first mode, and to scan one side of a stationary document on a scanning platen in a second mode. A scanning station, for scanning in a first mode, includes two scanning elements supported closely adjacent each other and on either side of the document path for scanning substantially simultaneously both sides of a document. A scanning platen supports a document for scanning in a second mode. One of the scanning elements is supported in a scanning position closely adjacent the other scanning element during said first mode and for scanning movement past said scanning platen in said second mode. A single sheet document input is also provided for the supply of single sheets or computer fanfold webs.

12 Claims, 4 Drawing Sheets

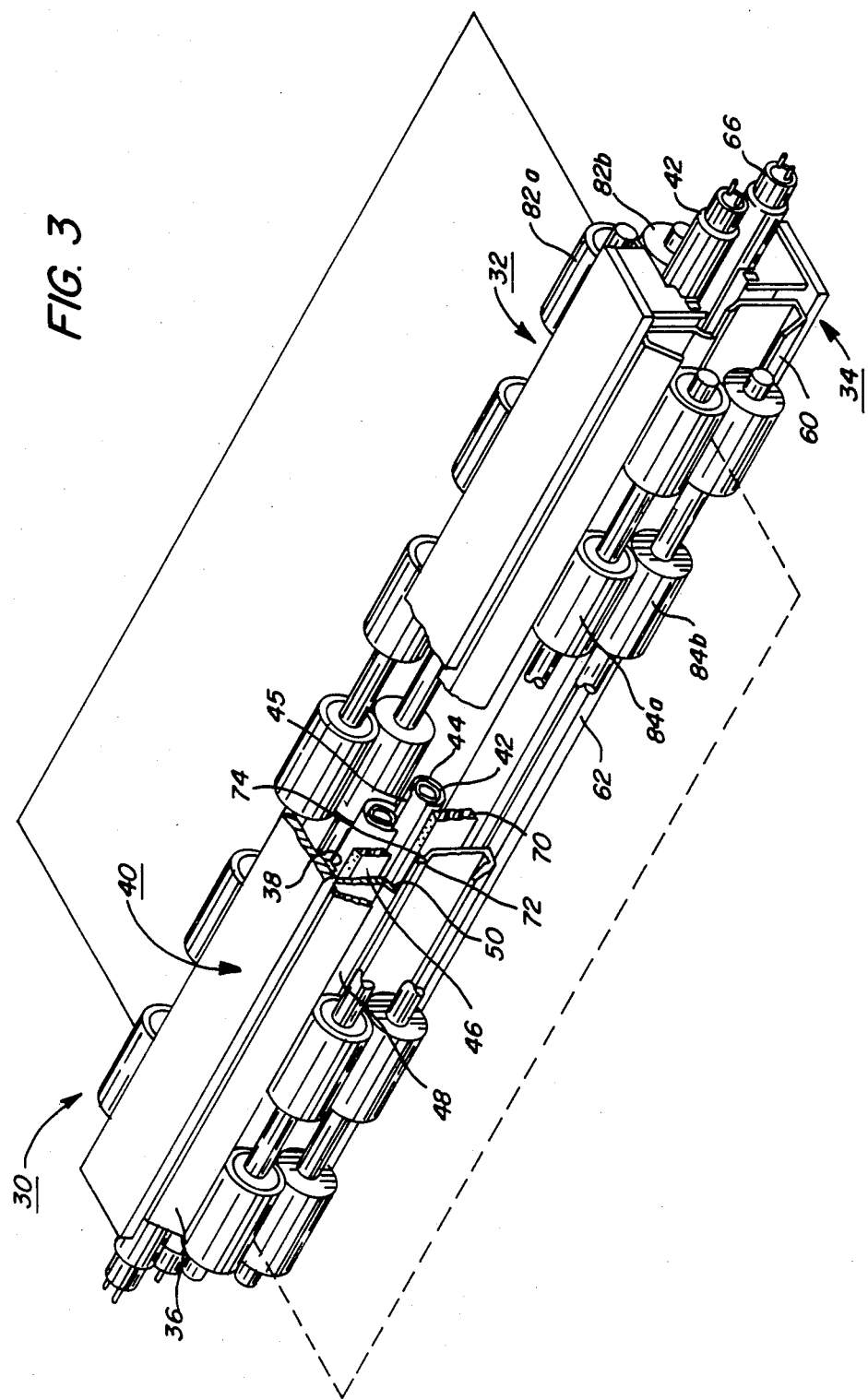

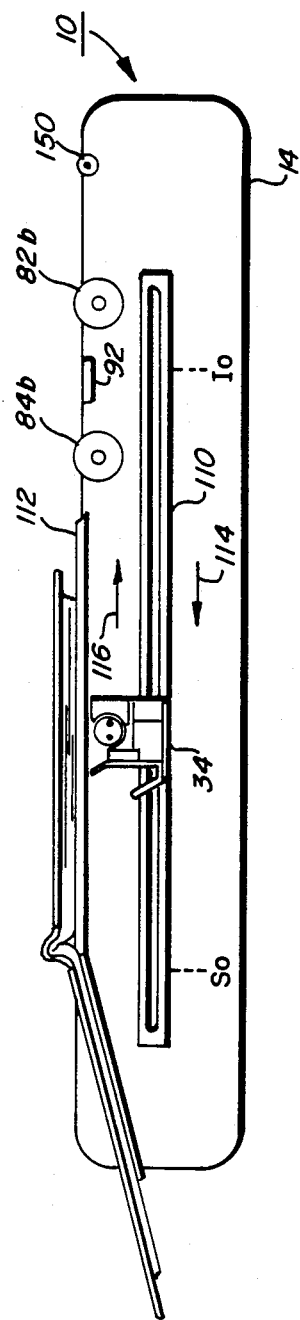

DUAL SCANNING ARRAY RASTER INPUT SCANNER

This invention relates generally to raster input scanners for acquisition of image information, and more particularly to a raster input scanner with an array of image scanning sensors suitable for scanning documents presented on a scanning platen or moved past the array.

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other that that in which it was originally available. Accordingly, it is desirable to have an image information input capability for such information. In addition to the production of new documents from electronically stored information, it will also be appreciated that some copying functions available in light lens-type copiers, copying images directly from original documents, may be more readily accomplished if image information is available electronically. Thus, with the capability of electronic input of information, coupled with available output devices, functions such as duplex copying, image rotation, cropping, editing, etc, are possible without the requirement of difficult mechanical manipulation of originals and copies.

A particular problem associated with electronic acquisition of image information is the speed of possible input. Heretofore, scanning arrays, i.e., linear or two dimensional arrays of semiconductor elements suitable for detection of light from an illuminated image, have been limited in size by an inability to manufacture sizeable lengths thereof, thereby requiring optical magnification and focusing elements to derive an image from a document suitable for detection by the sensors of the scanning array. It has been often necessary to provide overlapping lengths of small sensor arrays to build longer lengths to accommodate document scanning. While these scanning arrays have had some success, they require extensive software manipulation to provide a correct output image, resulting in slower data or image acquisition rates. In view of the slow rate of data acquisition, relatively little work has been done on a faster document handling system for such arrangements. Recently, however, scanning arrays have become available which include a linear array of sensors extending the full width of a document. These arrays may be used to scan a document with a single pass, without magnification or optical manipulation of the image to accommodate the size to the scanning array, or software manipulation of images from overlapping arrays. These arrays are also improving in speed of image acquisition so that less time is required for each sensor to derive sufficient light information about a given image point, and transfer the information to an electronic data processor. Such arrays and their benefits over previous types of sensor arrays are described in U.S. Pat. No. 4,604,161 to Araghi, incorporated herein by reference.

In view of the above factors, it has become desirable to provide arrangements allowing faster document handling, particularly adapted to these applications of raster input scanners. It is particularly desirable to provide a scanning device for scanning duplex documents, i.e., original documents having image information on both sides, for simplex documents having image information only on a single side, and for material not adaptable to be passed through sheet handling devices. In the past, this feature has been approached in raster input scanners in a variety of ways. As shown in U.S. Pat. No. 4,536,077 to Stoffel, an arrangement is provided with an optical system to direct light reflected from a first side of the document to a single scanning array, while the document is moving past a first position, and subsequently directing light from the second side of the document to the scanning array when it has reached a second position. The arrangement does not optimally substantially simultaneously scan the both sides of the document, requires expensive optical arrangements to transmit the image optically to the single sensor, and allows the operation of only a single sensor during a selected period of time. A disclosure entitled "Automatic Duplex Document Electronic Scanning" by Richard E. Smith, and published at Xerox Disclosure Journal, Vol. 8, No. 3 May/June 1983 at page 263, demonstrates both side scanning of a document with two spaced apart scanning arrays arranged on opposite sides of a document path, and platen scanning by a movable carriage supporting one of the arrays. This arrangement requires multiple scanning positions and document advancement through the scanning areas at significant expense. U.S. Pat. No. 4,429,333 to Davis et al. demonstrates an arrangement which requires inversion of documents for scanning both sides thereof at a scanning position. U.S. Pat. No. 4,571,636 to Itoh demonstrates an optical arrangement for scanning both sides of a document directed along a paper path with a single scanning array, while U.S. Pat. No. 4,261,661 to Thiers shows a similar arrangement in a light lens copier U.S. Pat. Nos. 4,563,706 to Nagashima and 4,562,485 to Maeshima demonstrate integral scanner/printer arrangements. All patents and publications cited hereinabove are incorporated herein by reference.

SUMMARY OF THE INVENTION

It is therefore an object of the invention to provide a raster input scanner suitable for scanning either simplex or duplex documents fed from a stack or placed on a scanning platen.

It is another object of the invention to provide a raster input scanner for acquiring image input information from both sides of a duplex sheet substantially simultaneously.

In accordance with the invention, a raster input scanner is provided having a document input, a sheet feeding path for transporting documents to a scanning station and to an output; a scanning station having two scanning elements, each supporting an array of photosensitive sensors, and arranged closely adjacent to each other on opposing sides of the paper feeding path for reading substantially simultaneously information on respective opposing sides of documents passing thereby.

In accordance with another aspect of the invention, a raster input scanner as described above is provided with a scanning platen suitable for support of original documents to be scanned. One of the scanning elements is supported for reciprocating movement across the scanning platen to scan documents placed on the platen.

In accordance with yet another aspect of the invention, both sides of a duplex document may be scanned substantially simultaneously while being advanced through a scanning station by a single transport.

It is accordingly an advantage of the invention that the use of dual scanning elements each provided with a scanning array, arranged closely adjacent to one another and on either side of the document path, allows documents having image information on one or both sides to be fed through a sheet path to allow scanning and data acquisition from both sides of the document. Scanning of both faces of the document may be performed substantially simultaneously, allowing an extremely compact scanning station, scanning optics and paper path. The provision of a single scanning station allows the use of a single document transport arrangement for advancing documents through the scanning station.

It is another advantage of the invention that one of the same scanning elements is supported for movement across a scanning platen to provide scanning and data acquisition from originals where it is not desirable or possible to feed the original through the sheet feeding apparatus of the device. The movable scanning element may integrally comprise sensors, light source and lens. The scanning element is useful for dual modes of operation.

Other objects and advantages will become apparent from the following description taken together with the drawings in which:

FIG. 3 is an isometric view of the scanning station and scanning carriage shown in FIGS. 1 and 2; and FIG. 4 is a schemtaic view of the raster input scanner as used in platen scanning mode of operation.

Figure 1:
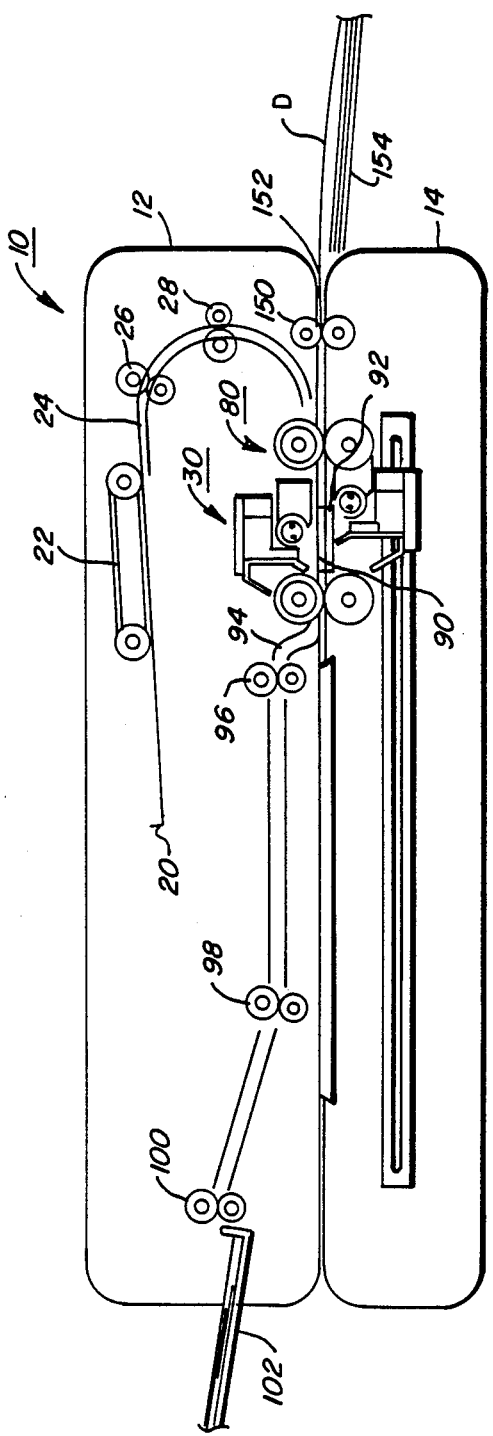
FIG. 1 is a somewhat schematic view of the of a raster scanning input device in accordance with the present invention and showing a sheet feeding mode of operation.

Referring now to the drawings where the showings are for the purpose of illustrating a preferred embodiment of the invention, and not for limiting same, FIG. 1 shows a raster input scanner 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. When necessary, the type of document for which the description finds use will be described with greater particularity. "Image" as used herein refers to the information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Raster input scanner 10 may be comprised of upper and lower frame members 12 and 14. Upper and lower frame members 12 and 14 may be generally rectangular box-shaped members, connected by a hinge member (not shown) along lower and upper rear edges of frame members 12 and 14, respectively. Upper and lower frame members 12 and 14 are separable in a clam shell fashion at the hinge member to allow access to the area thereinbetween as will hereinafter be described.

Upper frame member 12 is provided with a document input tray 20 for holding a stack of documents D such as cut sheets of paper face-up in the document tray from which data acquisition is desired. Document input tray 20 is provided with a document feeder 22 for feeding documents D out from document input tray 20. In a preferred embodiment of the invention, document feeder 22 may be a well-known top feeding vacuum corrugated feeder found in standard document feeders for light-lens type copiers for feeding documents in a 1-N order. Document input tray 20 may also be upwardly biased or provided with a tray elevator (not shown) to provide documents D in position for feeding.

Documents D are directed by document feeder 22 to an input sheet path 24 to be directed to a scanning position. Along sheet path 24, documents D are driven along by nip roll 26, comprising a pair of rubber rollers which drive the documents in a forward direction along the sheet path 24. A second nip roll 28 may advantageously comprise a cross roll deskewing nip to provide documents in a desired registered position before entering the scanning station. A drive motor (not shown) is provided for driving the document feeder, and drive rollers in the nips, as well as the other driving elements of raster input scanner 10.

Documents 10 are driven along input sheet path 24 into scanning station 30. Best viewed at FIGS. 2 and 3, and in accordance with the invention, scanning station 30 is comprised of upper and lower scanning elements 32 and 34. Upper scanning element 32 is fixed in position with respect to sheet path 24, and comprises an upper scanning element frame generally indicated as 36. As better shown in FIG. 3, frame 36 extends transversely across and above the path of document travel, for the support of the scanning array for scanning a document passing thereunder. Referring again to FIGS. 2 and 3, on an upper portion of frame 36, scanning array 38 is supported on scanning array support member 40, transverse to the path of sheet travel thereby for scanning documents. Scanning array support member 40 is a relatively rigid member fixed to the frame 36 by fasteners or adhesives, and supporting scanning array 38 in position across the path of document travel, without sagging or twisting which could cause imaging imperfections. Scanning array 38 may be a linear array of photosensitive sensors such as CCD's or photodiodes which are controlled to sense light reflected from a document during an integration period. The photosensitive sensors develop a charge indicative of the amount of light detected, for transmission to an image processor for use in assimilating an electronically stored representation of the image on the document. In a preferred embodiment of the invention, the array may comprise several smaller arrays butted at their ends to each other to form an unbroken array, as described in U.S. Pat. No. 4,604,161 to Araghi.

Documents directed past scanning element 32 are illuminated by a lamp assembly supported on frame 36 and comprising lamp 42, and lamp cover 44 having aperture 45 engaged to a power supply (not shown) and directing light towards the document to be scanned. Light from the illuminated document is reflected to lens 46, comprising a bundle of image transmitting fiber lenses produced under the tradename of SELFOC by Nippon Sheet Glass Company Limited, provided to direct light reflected from the document to scanning array 38. Adjacent to the portion of lens 46 closest to the document is a frame extension member 48, extending generally towards the document which may be advantageously provided with a light reflecting concave surface 50 to further aid in directing light from lamp 42 to illuminate the document. It will of course be appreciated that other optical and illuminating systems may be used to illuminate and direct light from the document to the scanning array 38.

Referring again to FIG. 2, lower scanning element 34 is provided as a mirror image of scanning element 32, including a frame 60, scanning array support member 62, scanning array 64, lamp assembly including lamp 66 and lamp cover 68 having aperture 69, lens 70 and frame extension member 72 having a reflective surface 74. The primary difference between the two scanning elements is that the lower scanning element 34 is arranged in a position opposing that of upper scanning element 32, in order to scan images on a side of the document opposite to that scanned by the upper scanning element 34. Accordingly, as viewed in FIGS. 2 and 3, images on the upper face of documents, passing through the scanning station 30 are illuminated and scanned by upper scanning element 32, while images on the lower face of the document are illuminated and scanned by the lower scanning element 34. In practice, it is preferable to have the elements slightly offset from one another so that the illumination provided for scanning one side of the document does not cause shadows detectable by the sensors in the scanning arrays to show through the documents.

Documents entering the scanning station are driven into and through the station by a four roll Controlled Velocity Transport (CVT) arrangement 80 comprising two sets of nip roll pairs 82 and 84 located at the entry and exit to the scanning station, respectively. Each nip roll pair is comprised of an upper drive roll 82a and 84a and a lower idler roll 82b and 84b. Drive rolls 82a and 84a are driven by a motor (not shown) which maintains the speed of the rolls and accordingly, the speed of documents moved by the rolls at a carefully controlled constant velocity. Speed variations should generally be avoided to maintain optimum image quality. The sensors forming the scanning arrays 38 and 64 are extremely small, and minor movement variations will alter detection of the image. The rollers comprising the CVT may be supported separately from the scanning stations at respective positions on the upper and ower frame portions.

Figure 2:
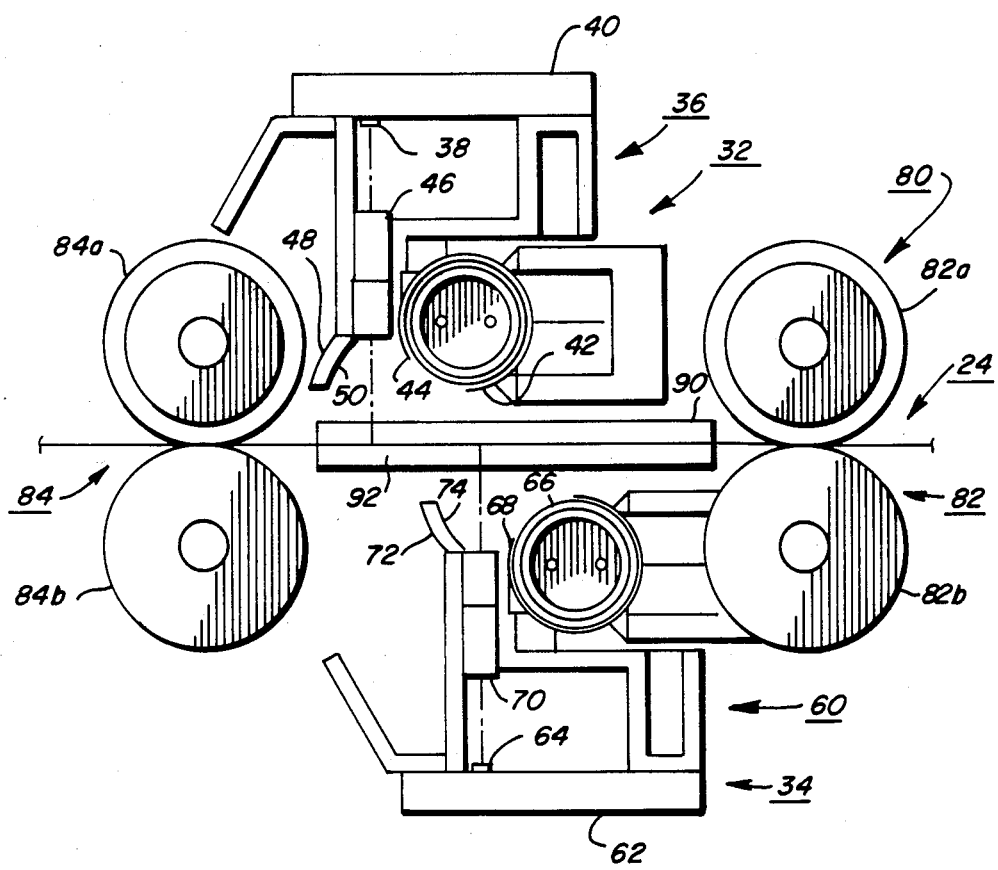
FIG. 2 is a side view in section of the scanning station and scanning carriage of the device of FIG. 1.

With reference to FIGS. 1 and 2, sheets transported through scanning station 32 are directed between platen glass members 90 and 92 supported respectively on upper and lower frame members 12 and 14 which serve to maintain flatness in documents advancing therethrough for scanning. The platen glass members 90 and 92 are each 4 mm thick, for support of the doucment as it passes through the scanning station. The platen glass member 90 and 92 are supported with a spacing of about 0.6 mm between them. The glass thickness and gap are chosen to be as small as possible because the depth of field of the SELFOC lens is very small. In another embodiment, the document may be biased against a single platen glass member by a baffle, thereby achieving the required flatness while the document passes through the scanning station.

As documents are advanced through scanning station 30, photosensitive sensors on scanning arrays 38 and 64 are repeatedly exposed to light reflected from the document to derive an electronic representation of the image thereon for transmission to an image processing or storage device. In a preferred embodiment of the invention, for duplex documents, image information from each side of the document is derived and transmitted alternately by each respective array. Thus, for example, while array 38 is deriving image information, array 64 may be transferring previously derived image information out of the array.

With reference again to FIG. 1, upon leaving the scanning station 32, documents are driven by CVT 80 to an exit sheet path 94 wherealong documents are driven by nip roll pairs 96,98 and 100 into an output tray 102. The passage of documents along the described sheet path, having a generally U-shape, with a single fold, and feeding the documents in the input tray 20 from the top of the input stack, provides a single natural inversion of the documents, so that they are arranged face down in output tray 102 in the same order that they were originally provided. In a preferred embodiment of the invention, output tray may be a simple low energy uphill stacking tray without requirement for mechanical document handling therein. While an arrangement providing a document handler reciruclating the documents back to an input tray is certainly possible, there is no need for the expensive and complicated mechanical document handling in those devices, since there is no need to repeatedly present the document for copying as in a light lens copier. Both sides of the document may be read simultaneously, and the image information stored for copying as desired in an electronic storage medium.

With reference now to FIG. 4, which shows lower frame member 14 with upper frame member 12 raised away from its position with respect to lower frame member 14, and therefore not shown, and in accordance with another aspect of the invention, lower scanning element 34, normally arranged closely adjacent to scanning element 32, is also supported for reciprocating scanning movement, as will be described hereinafter, on support rails 110. Support rails 110 are provided in lower frame portion 14, parallel to the direction of document travel of sheet travel through scanning station 30, and located, in a preferred embodiment, generally on either side of the path of sheet travel. In FIG. 4, only a single support rail 110 is shown, but usually at least two will be provided. Scanning element 34 may be provided with bearings or bushings to reduce sliding friction between scanning element 34 and the rails 110. Rails 110 support the scanning element 34 for movement across the length of lower frame portion 14 slightly below a scanning platen 112. Scanning platen 112 is a generally rectangular member having a size allowing the placement of documents thereon for scaning by the scanning element 34 as it moves across the length of the lower frame 14. Scanning platen 112 is supported at its edges on lower frame 14. Scanning platen 112 supports documents not readily fed from document input stack 20, such as pages of books, single sheets in bound documents, documents too thick, fragile or damaged to be fed along paper paths 24 and 94; or objects having surfaces, or profiles desired to be copied. On selection of platen copying, i.e., copying of images from document placed on scanning platen 112, lower scanning element 34 moves from an initial position $I_0$ fixed with respect to upper scanning element 32, and generally adjacent a first end of the scanning platen 112, across the length of lower frame 14 and scanning platen 112 in the direction of arrow 114 to a start of scan position $S_o$, the scanning array is generally inoperative for acquiring image data, although it well within contemplation of the invention to either scan the document for image information, or to provide a pre-scan operation which allows a fast, gross scanning operation to derive an appropriate contrast level, or threshold information for use by the image processing device. Image scanning is preferably accomplished by movement of the lower scanning element from position $S_o$ back to position $I_{0 l}$ in *the direction indicated by the arrow* 116.

Scanning element 34 is driven in its movement by any suitable drive arrangement (not shown) providing a very smooth, non-vibrating motion across the lower frame, such as for example a pulley and cable system or a lead screw drive system. Various vibration damping arrangements may be provided to damp undesirable motion, such as bearings, bushings or cushions. In operation the scanning element is driven from position $S_o$ to position $I_o$. As the scanning element is moved across the platen, the sensors of the sensor array are repeatedly exposed to incremental slices of the document, producing charge information indicative of the image on the document for use in assimilating an electronically stored image of the document. Desirable high speed movement of the scanning element requires that frame member 60 be relatively rigid to avoid bending under the stress of motion. It is also highly desirable to make the frame very lightweight to allow high acceleration rates.

In accordance with yet another aspect of the invention, as as best shown in FIG. 1, a semi-automatic document feeding mode (SADH), useful for feeding single documents or unburst computer fold documents through the raster input scanner is provided. In accordance with this aspect to the invention, an entrance nip roll pair 150 is provided adjacent a document feeding entrance or input 152 between upper and lower frames 12 and 14 of raster input scanner 10 and arranged to direct documents into the sheet path 24 to CVT 80 for feeding document through scanning station 30 as previously described. A tray 154 may be provided to support computer fan-folded documents (normally simplex documents) for feeding oriented to provide image information face-up to allow scanning by fixed scanning element 30. Documents entering the SADH input 152 will be directed to exit sheet path 94 to output tray 102.

Control of the described arrangement may be accomplished in a variety of ways, depending on the planned usage of the device. Feeding of documents, control of sheets directed through the sheet path operation during the desired modes of operation, including movement of the scanning element 34 in its scanning motion across the platen may be controlled by an on-board microprocessor of the type commonly used in the control of light lens copiers, or prior raster scanners and tailored to the application required by the present device. Control of the imaging assembly may also be an on-board microprocessor device which repeatedly polls the sensors of sensor arrays 38 and 64 to derive charge information indicative of the image on documents scanned thereby, assigns the derived data with address information and provides the addressed information as an output. The control of the device is responsive to operator information input. Alternatively, the described device may be partially or completely controlled by another device, such as for example, a computer, a local or remote workstation or compatible printer.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A dual mode raster input scanner having a first mode of operation for scanning either or both sides of a moving document passing through a scanning station, and a second mode of operation for scanning one side of a stationary document on a scanning platen, comprising:
    said scanning station, for scanning in said first mode, includes first and second scanning elements, each element including a scanning array of photosensitive sensors for detecting light reflected from a document;
    said scanning platen for supporting said stationary document manually placed thereon for scanning in said second mode;
    a document input;
    document transport means for moving said moving document to be scanned from said input to said scanning station and to an output along a document path during the first mode of operation;
    said first and second scanning elements supported closely adjacent and opposite each other on opposite sides of said document path with said scanning elements supporting said scanning arrays slightly offset from one another in said first mode for scanning substantially simultaneously both sides of said moving doucment as it passes through said scanning station; and
    means for supporting one of said first and second scanning elements in scanning position closely adjacent the other one of said scanning elements at said scanning station in said first mode of operation and for scanning movement across said scanning platen in said second mode of operation.

2. The scanner as defined in claim 1, wherein each of said scanning elements includes an illumination source for illuminating said documents for scanning, and a lens directing and focusing light from said document to said sensors.

3. The scanner as defined in claim 1 wherein said scanning arrays are comprised of a linear array supported parallel and transverse to the direction of said moving document travel through said scanning station.

4. The scanner as defined in claim 1 wherein said scanning arrays are arranged slightly offset from one another to avoid show through images from the opposing face of documents being scanned.

5. The scanner as defined in claim 1 wherein said one scanning element for scanning movement across said scanning platen is movable to a first mode scanning position opposite the other one of said scanning elements.

6. The scanner as defined in claim 1 wherein said transport means further comprises a continuous velocity transport for advancing documents therethrough past the scanning arrays at a controlled rate of speed.

7. The scanner as defined in claim 6 wherein said continuous velocity transport comprises two nip roll pairs each including a driver and idler arranged along and across said document path, each located on one of either upstream or downstream sides of said scanning station.

8. The scanner as defined in claim 1, wherein said document input includes a tray for supporting a stack of documents to be scanned.

9. The scanner as defined in claim 1 wherein said moving document moves along an input path that is generally U-shaped to provide a natural inversion of said documents advanced therethrough from said document input to said scanning station.

10. A raster input scanner for scanning either or both sides of a moving document passing through a scanning station, and for scanning one side of a stationary document on a scanning platen, comprising:
   said scanning station, comprising first and second scanning elements, each element including a scanning array of photosensitive sensors for detecting light reflected from said document, a light source for illuminating a document and a lens for directing light reflected from a document to said scanning array;
   said scanning platen arranged generally adjacent said scanning station for supporting said stationary document for scanning;
   a document input tray for supporting a stack of documents for scanning;
   a document path for conducting said moving document to be scanned from said input tray to said scanning station and to an output;
   a document transport for advancing documents from said input tray along said document path and to said output;
   said first and second scanning elements supported closely adjacent and opposite each other on opposite sides of said document path with said scanning elements supporting said scanning arrays slightly offset from one another for scanning substantially simultaneously both sides of said moving document as it passes through said scanning station; and
   a scanning support member supporting one of said first and second scanning elements in a fixed scanning position closely adjacent the other one of scanning elements for scanning advancing documents, and for scanning movement across said scanning platen.

11. The scanner as defined in claim 10 including a single document input along said document path for advancing single documents through said scanning station.

12. A raster input scanner for scanning either or both sides of a moving document passing through a scanning station, and for scanning one side of a stationary document on a scanning platen, and selectively operable in three modes, comprising:
   said scanning station, including first and second scanning elements, each element including a scanning array of photosensitive sensors for detecting light reflected from a document, a light source for illuminating a document and a lens for directing said light reflected from a document to said scanning array;
   said scanning platen arranged generally adjacent said scanning station for supporting said stationary document for scanning;
   a document transport for advancing said documents from said input tray through said scanning station to an output;
   said first and second scanning elements supported closely adjacent each other in opposed relationship for scanning substantially simultaneously both sides of an advancing document for a first mode of operation;
   a single document and form feed input between said document input tray and said scanning station for advancing single documents through said scanning station and to said output for scanning in a second mode of operation; and
   a scanning support member supporting one of said scanning elements in a fixed scanning position closely adjacent the other one of scanning elements for said scanning advancing documents in said first and second modes, and for scanning movement across said scanning platen for scanning documents in a third mode.

* * * * *